UNITED STATES PATENT OFFICE.

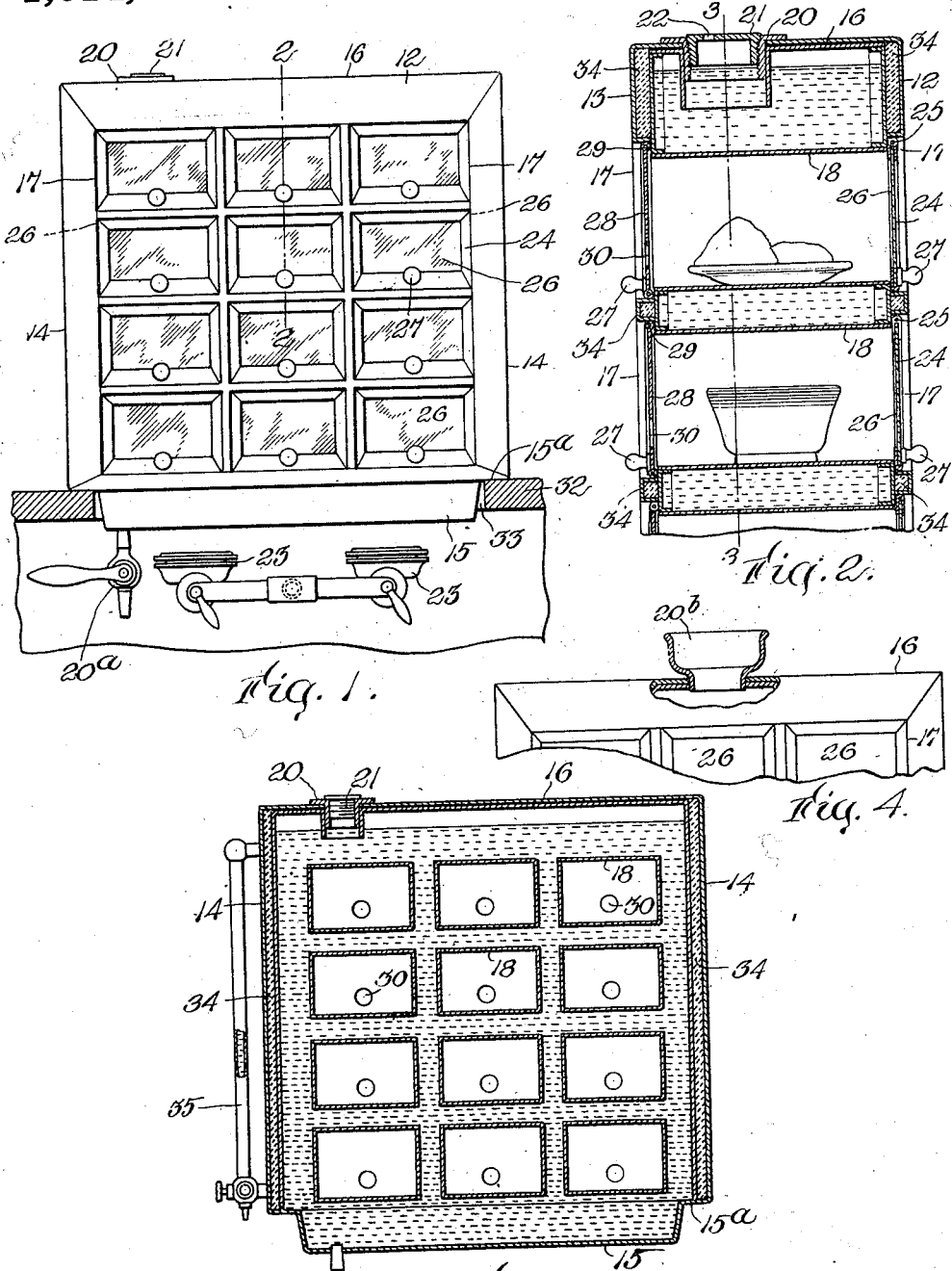

BERTHA STEVENSON, OF GLOUCESTER, MASSACHUSETTS.

LUNCH-COUNTER.

1,014,186.  Specification of Letters Patent.  Patented Jan. 9, 1912.

Application filed July 27, 1911. Serial No. 640,953.

*To all whom it may concern:*

Be it known that I, BERTHA STEVENSON, a citizen of the United States, and a resident of Gloucester, in the county of Essex and State of Massachusetts, have invented certain new and useful Improvements in Lunch-Counters, of which the following is a specification.

This invention relates to apparatus for serving individual orders of food in so-called "Cafeteria" lunch rooms, and it has for its object to provide a food counter comprising a plurality of receptacles or cells adapted to hold a plurality of different individual portions or orders of food at a point between the space devoted to attendants or serving girls, and the space devoted to customers, each receptacle being isolated from the others, protected from dust and dirt, and from promiscuous handling by the customers, and from germs from coughing, sneezing, etc., maintained at a predetermined temperature either hot or cold, accessible both to the attendants for refilling the receptacles, and to the customers to enable the latter to serve themselves, and exposed to view through doors from both sides of the counter, so that both the attendants and the customers can readily inspect the receptacles.

The invention consists in the improvements which I will now proceed to describe and claim.

Of the accompanying drawings which form a part of this specification,—Figure 1 represents a front elevation of an individual food counter embodying my invention; Fig. 2 represents a section on line 2—2 of Fig. 1, showing a part of the counter; Fig. 3 represents a section on line 3—3 of Fig. 2, showing the entire height of the counter; Fig. 4 represents a partial front elevation, showing an ice-receiving inlet in the top of the counter.

Similar reference characters indicate similar parts in all the figures.

In the drawings:—12 and 13 represent substantially vertical front and rear external walls which with the complemental end walls 14, 14, the bottom wall 15, and the top wall 16, form the exterior of a casing adapted to contain a suitable heating fluid such as hot water or steam, or a cooling fluid or mixture such as salt water, or brine, and ice. Each of the front and rear walls 12 and 13 is provided with a plurality of openings 17, to the margins of which are connected, by suitable fluid-tight joints, a plurality of box-shaped internal partitions or cells 18, which extend across the space between the front and rear walls, and form a plurality of food receptacles, which are open at both ends and coöperate with the external walls in forming a cellular jacket surrounding all portions of said receptacles excepting their ends. Said jacket is provided with suitable means for introducing and removing a temperature-controlling fluid. As shown by Figs. 1, 2 and 3, the top wall 16 is provided with an inlet 20 for said fluid, closed by a cap or cover 21, and the bottom is provided with a valved fluid outlet 20ª.

When the counter is to be kept hot, the cap 21 may be provided with a vent 22, (Fig. 2) adapted to permit a limited escape of steam, suitable heating means such as a gas burner or burners 23 being located below the bottom wall 15 in position to heat the same and a charge of water introduced into the jacket.

When the counter is to be kept cold, an inlet 20ᵇ is provided, this being formed to receive a sufficient supply of cracked ice, as shown by Fig. 4. In this case, the jacket may be charged with salt water, or brine, which is kept cold by the melting ice. More than one ice inlet may be provided if desired.

Each box-shaped partition or receptacle 18 is provided at the end, located in the front wall 12, with a door 24 hinged at 25 and provided with a sight opening covered by a transparent closure 26, preferably of glass, and with a handle 27 whereby it may be opened by a customer at the front side of the counter. Each receptacle is also provided at the end located in the rear wall 13, with a door 28 hinged at 29 and provided with a glazed sight opening 30, and with a handle whereby it may be opened by an attendant at the rear side of the counter.

The bottom wall 15 as here shown is provided with a downwardly offset portion surrounded by a raised marginal portion or shoulder 15ª adapted to rest on the top of a table or frame 32, said top having an opening 33 which receives the offset portion of the bottom. When the counter is heated, the burners 23 are supported under the table or frame, and the bottom wall is made of a suitable heat-conducting metal, the end walls 14 and the portions of the front and rear walls 12 and 13 being preferably constructed as non-conductors of heat. As here shown, each of said non-conducting walls is composed of inner and outer layers of sheet metal and an intermediate layer 34 of non-conducting material such as asbestos.

The bottom of each cell or receptacle 18 constitutes a shelf adapted to support a dish containing a portion of food. Each shelf extends from front to rear of the casing and is obstructed at its ends only by the doors 24 and 28, each end being unobstructed when the corresponding door is opened, so that the food may be readily inserted at one end of the shelf by the attendant, and removed from the opposite end by the customer.

It will now be seen that the described counter constitutes a structure which may be interposed between the space devoted to attendants and the space devoted to customers, and that the individual orders of food contained in the receptacles are kept at the desired temperature, shielded from dust and dirt and other contamination, and accessible to customers, who are enabled to supply their own wants, the attendants being required only to keep the several receptacles supplied, so that quick service is readily obtainable, the supply or service being easily kept in advance of the demand. A gage 35 may be provided to indicate the height of liquid in the jacket.

It has been found by actual practice that the described counter is a labor saving device, and enables one attendant to render in a given time, service which without the counter would have required two attendants.

The structure shown may be a unit or section of a larger structure composed of an assemblage of similar units placed end to end.

I claim:

1. A lunch counter for individual orders provided with external walls including front and rear walls, and a plurality of open-ended box-like food-holding receptacles having their ends secured to the front and rear walls respectively, the ends of said receptacles being each provided with a door, whereby each receptacle is accessible to an attendant in rear of the counter and also to a customer in front of the counter, said receptacles being spaced apart and coöperating with said external walls to form a cellular jacket for a temperature controlling medium.

2. A lunch counter for individual orders provided with external walls including front and rear walls, and a plurality of open-ended box-like food-holding receptacles having their ends secured to the front and rear walls respectively, the ends of said receptacles being each provided with a door, whereby each receptacle is accessible to an attendant in rear of the counter and also to a customer in front of the counter, the front doors having sight openings provided with transparent closures, said receptacles being spaced apart and coöperating with said external walls to form a cellular jacket for a temperature controlling medium.

3. A lunch counter for individual orders provided with external walls including front and rear walls, and a plurality of open-ended box-like food-holding receptacles having their ends secured to the front and rear walls respectively, the ends of said receptacles being each provided with a door, whereby said receptacles are accessible to an attendant in rear of the counter and also to a customer in front of the counter, said receptacles being spaced apart and coöperating with said external walls to form a cellular jacket for a temperature controlling medium, the bottom external wall being adapted to conduct heat, while the remaining external walls are non-conductors of heat.

In testimony whereof I have affixed my signature in presence of two witnesses.

BERTHA STEVENSON. [L. S.]

Witnesses:
H. Y. MEHLNET,
A. A. BRICKETT.